(12) United States Patent
Sundaravel

(10) Patent No.: US 8,930,598 B2
(45) Date of Patent: *Jan. 6, 2015

(54) ISOLATED PROTECTED ACCESS DEVICE

(71) Applicant: Clisertec Corporation, Framingham, MA (US)

(72) Inventor: Vale Sundaravel, Framingham, MA (US)

(73) Assignee: Sujiyama, Inc., Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,879

(22) Filed: May 23, 2013

(65) Prior Publication Data

US 2013/0254439 A1 Sep. 26, 2013

Related U.S. Application Data

(63) Continuation of application No. 12/769,173, filed on Apr. 28, 2010, now Pat. No. 8,473,651.

(60) Provisional application No. 61/173,930, filed on Apr. 29, 2009, provisional application No. 61/173,926, filed on Apr. 29, 2009.

(51) Int. Cl.
| | |
|---|---|
| *G06F 3/00* | (2006.01) |
| *G06F 13/12* | (2006.01) |
| *G06F 13/38* | (2006.01) |
| *G06F 13/00* | (2006.01) |
| *G06F 3/02* | (2006.01) |
| *G06F 3/023* | (2006.01) |
| *G06F 21/30* | (2013.01) |
| *G06F 21/56* | (2013.01) |
| *G06F 21/74* | (2013.01) |
| *H04L 29/06* | (2006.01) |

(52) U.S. Cl.
CPC .............. *G06F 3/0227* (2013.01); *G06F 13/12* (2013.01); *G06F 13/38* (2013.01); *G06F 3/023* (2013.01); *G06F 21/305* (2013.01); *G06F 21/567* (2013.01); *G06F 21/74* (2013.01); *H04L 63/0209* (2013.01)
USPC ........ 710/62; 710/1; 710/65; 710/69; 710/100

(58) Field of Classification Search
USPC ................................ 710/1, 62, 65, 69, 100
See application file for complete search history.

(56) References Cited

U.S. PATENT DOCUMENTS

| | | | | |
|---|---|---|---|---|
| 6,378,009 | B1 * | 4/2002 | Pinkston et al. | 710/62 |
| 7,028,110 | B2 * | 4/2006 | Seki et al. | 710/36 |
| 7,284,278 | B2 * | 10/2007 | Anson et al. | 726/34 |
| 7,840,728 | B1 * | 11/2010 | Sivertsen | 710/73 |

(Continued)

*Primary Examiner* — Idriss N Alrobaye
*Assistant Examiner* — Getente A Yimer
(74) *Attorney, Agent, or Firm* — Clock Tower Law Group; Erik J. Heels; Michael A. Bartley

(57) ABSTRACT

A computer switching device is disclosed which enables switching between a local computer and a secure computer connected through a network. The device sits like a keyboard-video-mouse (KVM) and optionally audio device between the local computer and the local input/output devices, but connects to the secure computer through a network. Access to the secure computer is pre-configured in the switching device through access and security settings for a specific user to the specific secure computer. The switching device specifically prevents access to the secure computer by the local computer, printer, or storage devices such as fixed or removable media drives. Tamper detection is included to disable secure access on any tampering with the switching device.

15 Claims, 4 Drawing Sheets

(56) References Cited

U.S. PATENT DOCUMENTS

| | | | |
|---|---|---|---|
| 7,861,020 B1* | 12/2010 | Sivertsen | 710/73 |
| 7,966,402 B2* | 6/2011 | Emerson et al. | 709/226 |
| 2003/0110328 A1* | 6/2003 | Seki et al. | 710/36 |
| 2003/0182573 A1* | 9/2003 | Toneguzzo et al. | 713/201 |
| 2004/0042547 A1* | 3/2004 | Coleman | 375/240.01 |
| 2006/0107061 A1* | 5/2006 | Holovacs | 713/182 |
| 2010/0106884 A1* | 4/2010 | Abraham et al. | 710/316 |
| 2011/0080342 A1* | 4/2011 | Haren | 345/163 |
| 2011/0145451 A1* | 6/2011 | Soffer et al. | 710/64 |

* cited by examiner

ISOLATED PROTECTED ACCESS DEVICE

CROSS-REFERENCE TO RELATED APPLICATIONS

This utility patent application is a continuation of U.S. patent application Ser. No. 12/769,173, filed Apr. 28, 2010, titled "Isolated Remote Access Device" in the name of Vale Sundaravel, which claims priority from U.S. provisional patent application Ser. No. 61/173,930, filed Apr. 29, 2009, titled "Isolated Remote Access Device" in the name of Vale Sundaravel, and from U.S. provisional patent application Ser. No. 61/173,926, filed Apr. 29, 2009, titled "Isolated Terminal Device" in the name of Vale Sundaravel, each of which is hereby fully incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright Clisertec Corporation, 2013.

BACKGROUND

1. Field of Technology

This disclosure relates to computer devices, and more particularly to secure switches for accessing multiple computers.

2. Background

There are many situations in which users of computers need to access multiple computers. This may be between accessing a desktop computer for general work and a specific-purpose computer for access to particular programs, or accessing a remote computer while physically at a separate local computer. When the two computers are both local and physically accessible, this is not a problem. Users can physically move between the two machines, or use switch devices such as a conventional Keyboard-Video-Mouse (KVM) switch to toggle between different computers. When physical access to both systems is not desired or possible, additional access, security, and usability problems are raised.

Multiple solutions allow remote access from one computer to another. Remote access technology includes virtual private networking (VPN), virtual or remote desktops, or specific remote applications allow remote computing. These technologies typically rely on user authentication such as a username and password. Such security verifies that the person making access has the required access code, but does not verify it is that actual person or what device is being used for access. Additional security can be added such as biometric authentication or hardware authentication devices such as security USB dongles. This adds a second level of verification, but does not ensure the security of the device being used for access. Once access is established, local programs such as computer viruses or user misuse such as copying or printing may breach security of the remote computer. Applications may be run to lock down the local machine, including virus protection and device access control programs, but uses resources on the computer reducing computer performance available for the user, and is still vulnerable should any of the lock-down programs be compromised.

3. Description of Prior Art

There is much prior art focusing on development of KVM switches.

U.S. Pat. No. 6,378,009 "KVM (KEYBOARD, VIDEO, AND MOUSE) SWITCH HAVING A NETWORK INTERFACE CIRCUIT COUPLED TO AN EXTERNAL NETWORK AND COMMUNICATING IN ACCORDANCE WITH A STANDARD NETWORK PROTOCOL" (Pinkston, Apr. 23, 2002) discloses a KVM switch where "information from a remote terminal is transferred on a network in a packet where the switch information in the packet uses a standardized management protocol . . . . The [ ] switch then responds to the switch information by performing a control function, providing status information to the remote terminal, or by changing security information." Thus Pinkston discloses remote management and administration of a KVM switch.

U.S. Pat. No. 6,671,756 "KVM SWITCH HAVING A UNIPROCESSOR THAT ACCOMMODATE MULTIPLE USERS AND MULTIPLE COMPUTERS" (Thomas, Dec. 30, 2003) discloses "a KVM switch having a uniprocessor architecture that accommodate multiple users and multiple computers—even multiple users to a single computer—via interrupt servicing provides dramatic improvements over common matrix-type KVM switches." Thus Thomas discloses a switch handling multiple users simultaneously.

U.S. Pat. No. 7,519,749 "REDIRECTING INPUT AND OUTPUT FOR MULTIPLE COMPUTERS" (Sivertsen, Apr. 14, 2009) discloses "a redirection module captures and transmits video signals from a local computer through over a network, such as the Internet, to a remote computer where the remote computer produces a display that contains the screen frames being transferred. The module is configured for use with and installation within a keyboard, video, and mouse switch configured for receiving the module." Thus Sivertsen discloses screen-grabbing for remote display which may be done at a local KVM switch.

United States Patent Application Publication 2005/044184 "NETWORK BASED KVM SWITCHING" (Thomas, Feb. 24, 2005) discloses "a keyboard/video/mouse (KVM) switching protocol is disclosed in which KVM information is applied to a network of workstations . . . . The system provides motherboard access to the servers that is characteristics of KVM switches but provides essentially unlimited scalability not known in traditional KVM switches." Thomas thus discloses converting KVM signals into a network protocol.

In addition to prior art related to KVM switching between two separate computers, some solutions focus on putting multiple computers together into a single location, with one computer less secure than another or each computer for separate purposes.

United States Patent Application Publication 2004/0107358 "DATAVAULT X4 MULTI-NETWORK SECURE COMPUTER" (Shiakallis, Jun. 3, 2004) discloses "a dual computer system with two or more separate network domains . . . incorporating two totally separate (CPU), motherboards, (RAM), hard drives, floppy drives, (CD-ROM) drives, a secure removable hard . . . " Such solution does not protect the secure computer from physical access, nor allow remote access without going through a full computer with physical access.

U.S. Pat. No. 6,578,140 "PERSONAL COMPUTER HAVING A MASTER COMPUTER SYSTEM AND AN INTERNET COMPUTER SYSTEM AND MONITORING A CONDITION OF SAID MASTER AND INTERNET COMPUTER SYSTEMS" (Policard, Jun. 10, 2003) discloses "desktop computers sharing components and having divergent operating systems, hard drive(s) and memory for the expressed purpose of segregating the day to day data processing functions and files from access to the Internet and downloading information and e-mail therefrom." Policard discloses two fully functional computers in a single box with some shared components, which does not provide physical security or total separation of a local computer with a remote resource.

None of the known prior art provides a switching product with 1) dedicated remote access to a computer resource configured for a specific secure user, 2) unaffected access to a local computer resource, and 3) complete separation so that data from the remote resource cannot be accessed, downloaded, or printed by local computer resources. What is needed, therefore, is a computer switching device that overcomes the above-mentioned limitations and that includes the features enumerated above.

BRIEF SUMMARY OF THE INVENTION

A computer switching device is disclosed which enables switching between a local computer and a secure computer connected through a network. Similar to a traditional keyboard-video-mouse (KVM) switch, the device attaches directly between the local computer and the local keyboard, video, and mouse devices. Unlike traditional KVM switches, there is no directly connected second computer, but rather a secure computer connected through a network. The device switches the keyboard, video, and mouse input/output between the local computer and the secure computer, providing total data security by preempting the ability to copy, print, or store information accessed on the secure computer to the local computer.

Features and Advantages

Such a computer switching device has multiple advantages in various situations. Within an office, workstations (physical or virtual) can be located in a secure area away from workers' physical access. Workers can access the workstations without fear of breaching sensitive information via thumb, CD-Rom, flash or other drives, or printing. Because the channel to the workstation is fully separated from the local computer, copy-paste security breach is prevented and there is no need to lock down the local computer with additional security software. Eliminating this crippling lock-down procedure may significantly increase worker productivity by improving performance of the local computer.

Outside a closed office, the computer switching device enables effective, secure remote access for teleworkers. Each switching device is custom-built for each user and pre-configured to automatically connect to remote secure environments through existing technology such as virtual private networks (VPN). Attaching the device to a home computer is as easy as plugging in the mouse, keyboard, and video. Because no software is installed or run on the home or local computer, little ongoing support is needed to install, operate, or maintain the device. Physical separation of the local and remote computers obviates possible transfer of information between the two.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Terminology

The terminology and definitions of the prior art are not necessarily consistent with the terminology and definitions of the current disclosure. Where there is a conflict, the following definitions apply.

"Secure remote computer resource" is the networked computer or application accessed by the disclosed switching device. The requirements of a secure remote computer resource are that it has capability of remote video, keyboard, optionally mouse, and optionally audio control, such as through remote desktop technology, and that it is restricted to secure access channels which may be established by an accessing computer.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Figure 1:
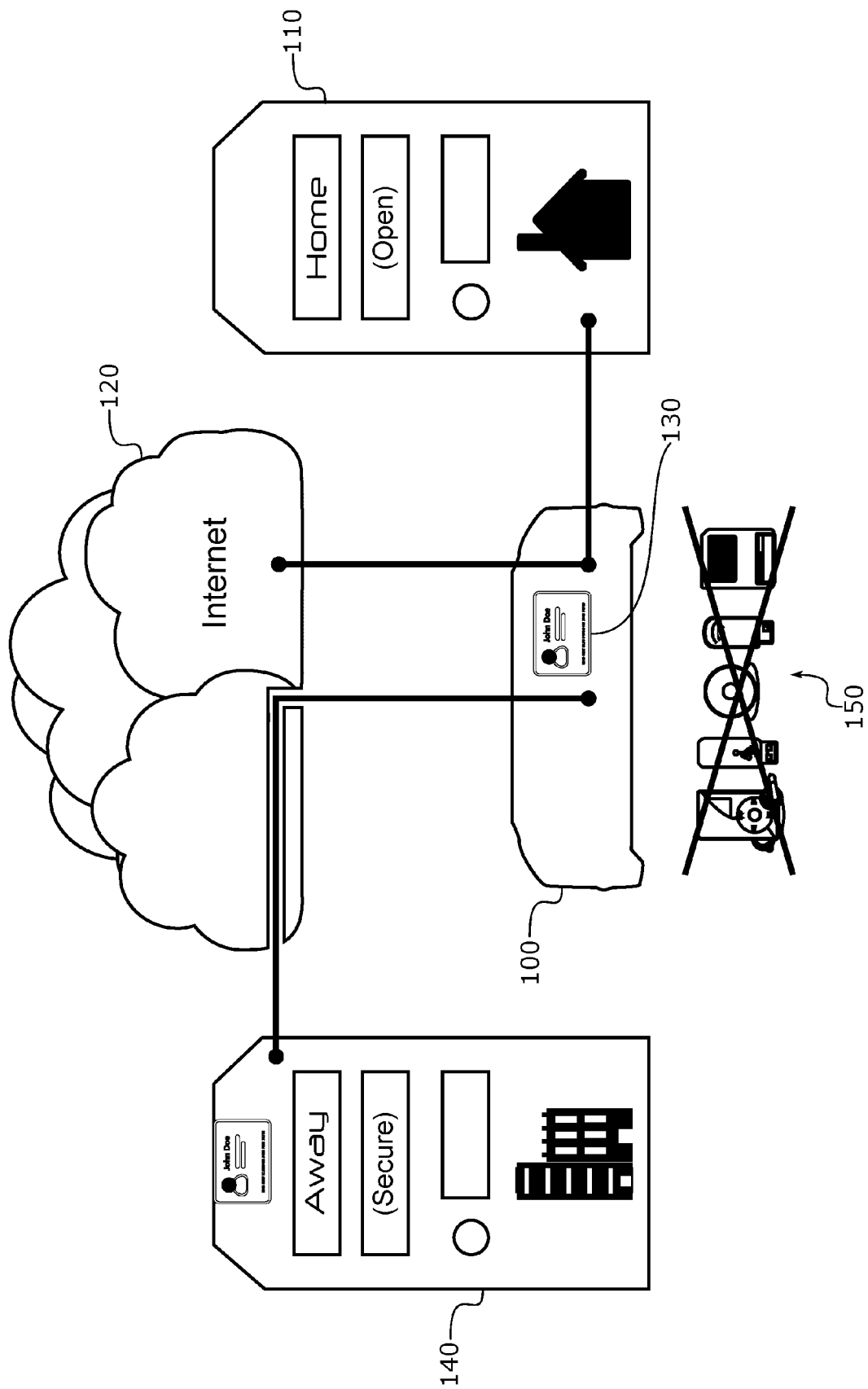
FIG. 1 is a drawing of the disclosed device connected to a local and to a secure computer.

FIG. 1 illustrates the use of the disclosed computer switching device. Computer switching device 100 is connected directly to local computer 110. Device 100 is also connected to Internet 120 or to whichever network local computer 110 would normally connect to. Through device 100, local computer 110 has normal access to network or Internet 120 without any additional restrictions. Security credentials 130 are stored within device 100, allowing connection via network or Internet 120 to a secure remote computer resource, shown here as secure computer 140. Computer switching device 100 allows switchable access to local computer 110 and secure computer 140 without allowing any access between systems or to both systems at the same time. Normal network connections to local computer 110 are maintained connected even when switched to secure computer 140. No connectors for media storage devices 150, including but not limited to compact disks, USB drives, floppy or hard disks, or mobile computing devices, are physically included or operable with device 100, leaving access to computer 140 secure. Thus, while connected to secure computer 140, computer switching device 100 provides total data security by blocking the ability to copy, print or store information accessed over the secure connection to the local computer, printer or any storage medium.

Figure 2:
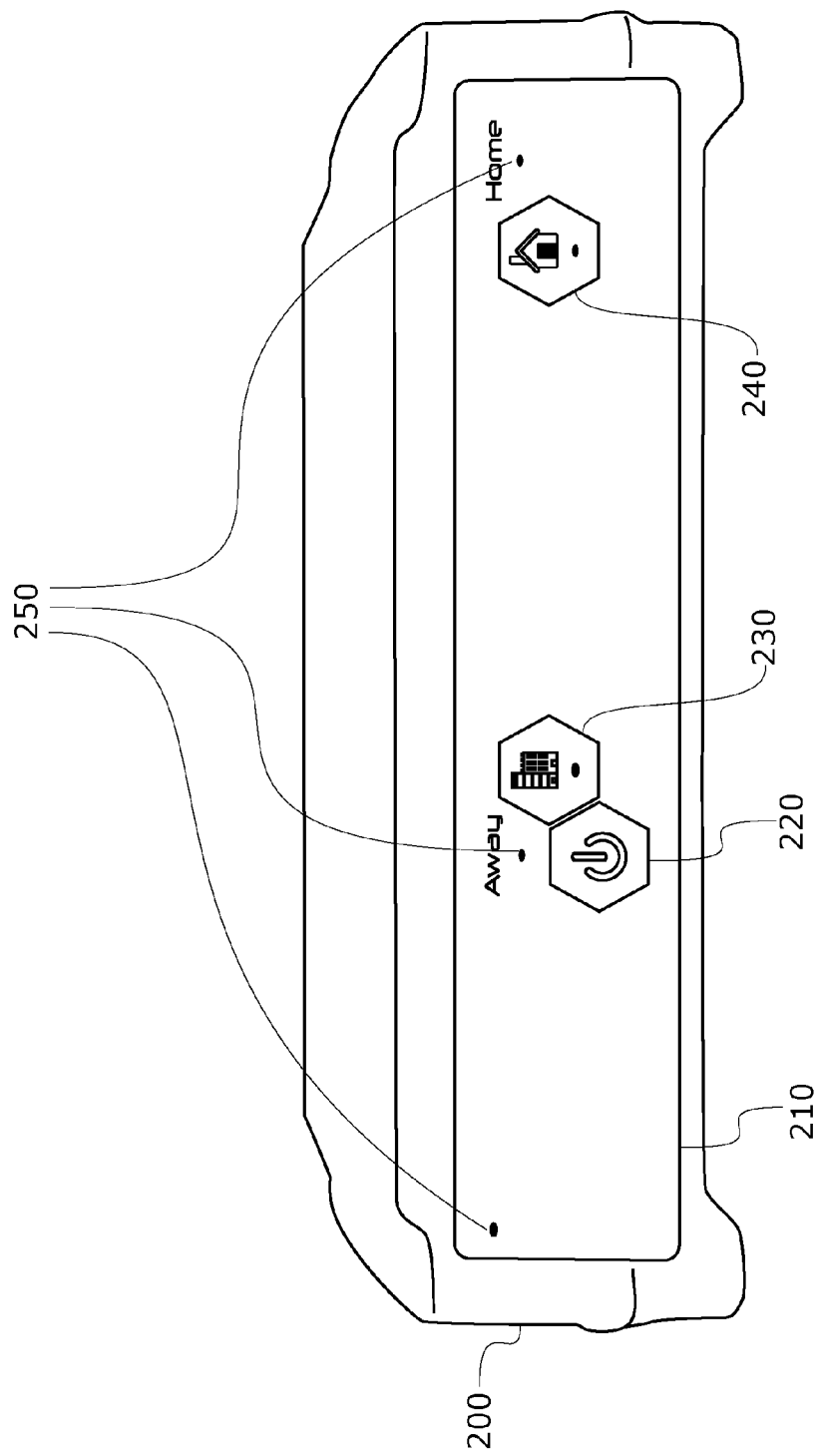
FIG. 2 is an drawing of the front of one implementation of the disclosed device.

FIG. 2 shows a front view of computer switching device 100. In a preferred embodiment, exterior housing enclosure 200 includes front control panel 210 with power button 220, away or secure computer button 230, and home or local computer button 240. Status lights 250 may be included indicating status of the computer switching device, secure or away computer, and home or local computer. Power button may enable power to the internal switching mechanism as well as access device to secure or away computer. Specific computer buttons may switch the device to that specific computer, and may include indicator lighting to illustrate which computer is selected. Alternative configuration, or even complete removal, of the front panel may be done, such as addition or removal of status indicator lights, removal of power switch and operation in an "always on" condition, and replacement of computer selection buttons with alternative switching means, such as processing specific keyboard commands.

Figure 3:
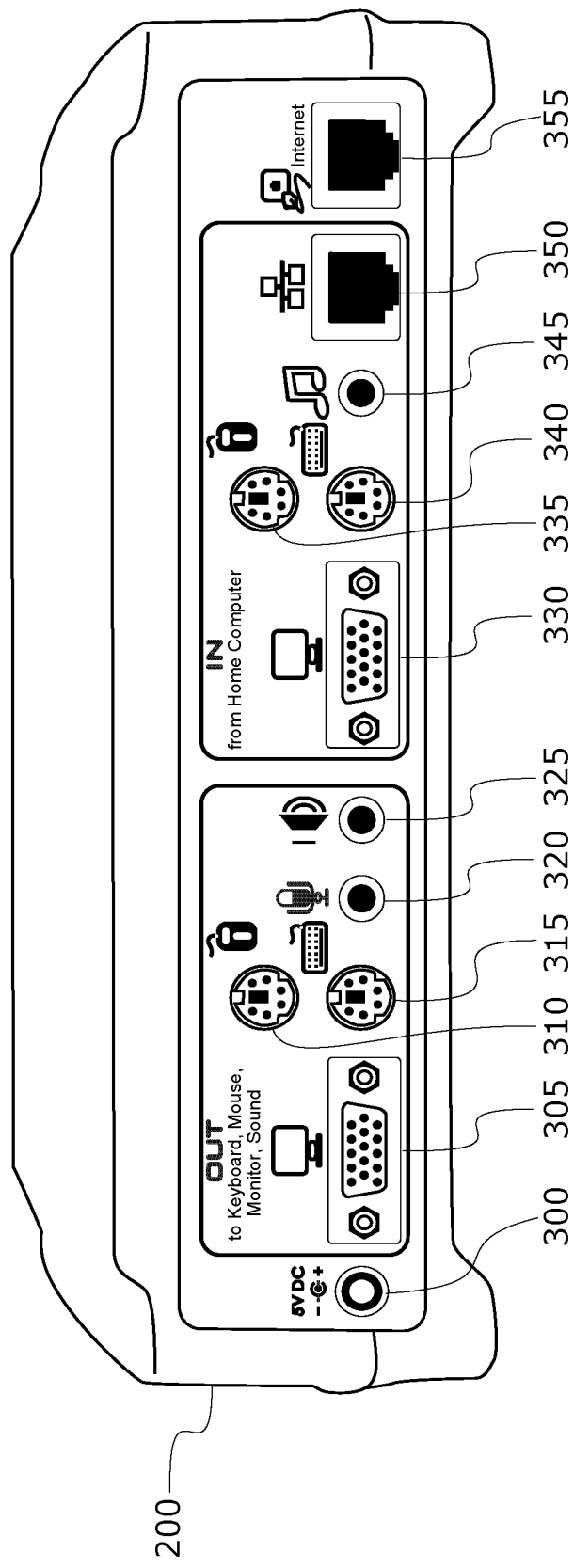
FIG. 3 is a drawing of back of one implementation of the disclosed device, showing one arrangement of connectors.

FIG. 3 shows a rear view of computer switching device 100. In a preferred embodiment, exterior housing enclosure 200 includes connectors for power, keyboard, mouse, video, network, and connection to the local computer. Audio and microphone may optionally be included. Alternative arrangement of the connectors, or alternative connection types (such as differently pinned connectors) may be used to provide hardware to specific keyboard, mouse, or video devices as needed. General purpose connectors which could be used to connect alternative media, such as USB connectors for USB mice support, are specifically excluded from computer switching device 100. USB mice and keyboards may be connected by using a USB-to-PS2 adapter, or other adapter which converts USB devices to match the appropriate connector on computer switching device 100. Power connection 300 supplies power to the internal components of device 100. Outbound connectors for video 305, mouse 310, and keyboard 315 are for connection to the physical monitor, keyboard, and mouse used by a user. Optional connectors for in-bound audio 320 and out-bound audio 325 may be connected to microphone and speakers. Embodiments without support for audio may leave these connectors out or include them without any enabled functionality. Inbound connectors for video 330, mouse 335, keyboard 340, optional audio 345, and network 350 are for connection to the equivalent connection ports on the local or home computer. Network connector 355 connects to the Internet or network that the local computer would connect to should device 200 not be used. Although standard VGA connectors are shown in 305 and 330, connectors such as Digital Visual Interface (DVI) may be used.

Figure 4:
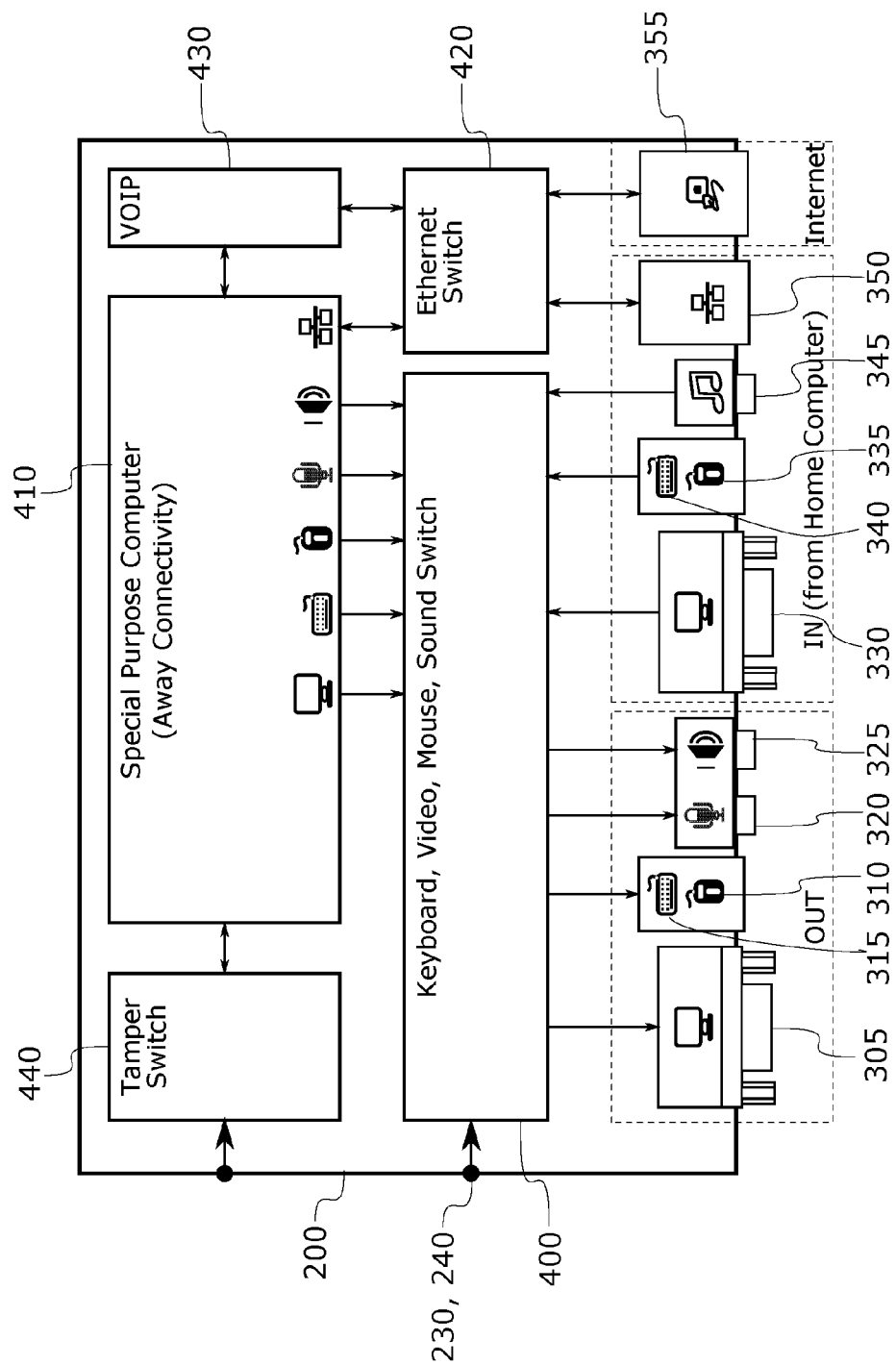
FIG. 4 is a drawing of the interior components of the device, showing connections between interior components and exterior connectors.

FIG. 4 shows the interior components of computer switching device 100. Switch 400 is a Keyboard-Video-Mouse (KVM) switch for switching outbound connectors 305, 310, and 315 between inbound connectors from the local computer and connection to internal special purpose computer 410. If audio is also included it may also be switched by switch 400. Switch 400 may be controlled by buttons 230, 240, by observing keystrokes received at outbound keyboard connector 315 and tracking for specific keystroke sequences programmed to control switch 400, or other switch control known to those in the art.

Special purpose computer 410 is an internal computer to securely access and operate the secure remote computer resource. Computer 410 may connect to the secure remote computer resource by network connection through network or ethernet switch 420. Network or ethernet switch 420 connects the local computer via network connection 350 and the special purpose computer to outgoing network connection 355. Should wi-fi, cellular modem, or other specific-network access devices be required, support may be included in network or ethernet switch 420. In a preferred embodiment, network switch 420 is a standard ethernet switch with channels from outgoing network 355 to both the local computer connection 350 and to special purpose computer 410 maintained as connected at all times. In contrast, KVM switch 400 operates as an actual switch in that only one of special purpose computer 410 or the locally connected computer is connected to outgoing connectors 305, 310, 315, and optionally 320 and 325 at a time. This KVM switch behavior may be modified should voice-over-ip be included for handling microphone and audio. In such case, VOIP processor 430 may be included or integrated into special purpose computer 410, and when VOIP is active microphone and audio would direct through the KVM switch for VOIP processing no matter which computer (local or remote) is active on the KVM switch.

Special purpose computer 410 may operate software embedded in hardware such as a single board computer (SBC) board with CPU, video processor, and memory, and keyboard, mouse, video, and optionally audio connectors connected to the KVM switch 400. Special purpose computer 410 has no connections which may locally connect to external print or storage media device, including but not limited to usb devices, disk drives, and printers. In a preferred embodiment, the software embedded in special purpose computer 410 lacks driver support or ability to load, operate, or interact with local external storage or media devices. The embedded software may be customized to access a specific remote application or resource, or use standard known technology such as Microsoft Windows Embedded CE operating Microsoft Terminal Services Client or Remote Desktop Connection, other remote desktop client, and use secure connection such as through a virtual private network (VPN). Secure identification and configuration may be embedded in special purpose computer 410 identifying a specific user to a configured specific secure remote computer resource. This may be done with security certificates or other security technology standard in the art.

To ensure security after embedding and configuring the software and security, tamper switch 440 may be connected to special purpose computer 410 and housing enclosure 200, and housing enclosure 200 may then be sealed. Any physical tampering or access to the housing may trigger tamper switch 440, which turn may reset configuration and security settings, including any security certificates, embedded in special purpose computer 410. Different secure techniques may be applied, including use of non-imprinting memory, for destruction of security settings and certificates. Thus access to the secure remote computer resource becomes disabled on any tampering of the device.

Configuration of computer switching device may be done prior to activating the tamper switch and locking the device. Alternatively, different techniques may enable configuration changes after locking. A secure authority may be established and the special purpose computer configured to also connect to the secure authority and access new settings. Such setting changes could be limited to non-critical aspects, such as video resolution settings for the KVM switch, configuration of local network settings, or expanded to allow for updating security configurations and settings stored in the device.

Other Embodiments

As will be apparent to those skilled in the art, additional variations and embodiments of this disclosure may be implemented. For example, a biometric sensor such as a fingerprint reader may be added to the unit to further enhance security to provide three-factor authentication. Similarly, a smart card reader may be included to further enhance security. This may be added internally for security configured before final device locking, or with a specific internal adapter for reading an external smart card for secure verification. In addition to a smart card reader, the connector panel may include USB interfaces for Keyboard, Mouse, and Video, with an internal electronic adapter converting the USB devices without compromising security or enabling USB device support by the special purpose computer.

Beyond altering security, modification of the connections and applications may be made. Multiple special purpose computers may be included to allow connection to one of multiple authorized secure remote computers. Alternatively, a single special purpose computer may be configured with security certificates and settings for multiple secure remote computers, again allowing switching between multiple remote systems.

In addition to security, the actual hardware may be altered. A touch panel may replace the font panel, thus facilitating further customization of customer interaction and feedback. Commodity components such as the single board computer, network switch and KVM switch may be replaced with a customized computer board that integrates just the required components. Similarly, a custom or proprietary operating system may replace commodity embedded operating systems such as Windows Embedded CE. Thus the device may be customized for specific purposes.

One such specific purpose could be to deliver video output in encrypted format that only a designated video display device can render. This embodiment will ensure security of information till the endpoint. This could be used by media delivery companies such as cable and satellite TV operators to isolate premium content over the secure channel without interfering with other content but guaranteeing protection from media piracy. For example, the internal network switch may be capable of connecting and communicating with a cable, broadcast, or other video network, such as coaxial or fiber optic networks. Switching functionality may be between the premium content accessed and processed through the special purpose computer, and standard content broadcast on the network without any special device required. In such an embodiment, inbound connectors to the local computer may be removed from the device as the KVM switch controls switching video content between the special purpose computer and the video network connection.

Another embodiment may alter or add input connectors. For example, industrial control signal connectors may be added to the housing box such that the signals are transmitted to the secure remote resource through the special purpose computer. Such control signals may be configured to be transmitted at all times, or only when the device is switched to access the secure remote resource. Alternatively, the device can be restricted to a secure remote industrial control by removing the switching and replacing the computer IN ports with industrial control input signals. In this single-purpose embodiment the control signals are transmitted to the secure remote resource and access to that information provided to the user in a secure fashion using the built in special purpose computer. In both cases, the special purpose computer may receive local control signals to pass to the remote resource while still protecting against local copying, printing, or downloading of data from the remote resource.

An alternative embodiment focusing on mobile users may configure the device in a laptop, tablet, other mobile computer form-factor that provides secure remote connectivity using cell-modem technology, thus bringing isolated and protected access to secure remote computers from lightweight mobile computers. The computer IN ports may be completely removed rendering the mobile device only capable of accessing remote secure computers, or directly connected to the laptop system allowing operation as a local laptop with included switching to remote secure computer.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer switching device comprising:
   a housing box;
   an internal Keyboard-Video-Mouse switch connected to one or more outbound connectors located on the housing box for connection to physical input-output devices, and the Keyboard-Video-Mouse switch connected to one or more inbound connectors located on the housing box, the inbound connectors grouped as a first computer connection to the Keyboard-Video-Mouse switch;
   an internal special purpose computer processor configured to remotely operate a secure remote computer resource, the internal special purpose computer connected as a second computer to the Keyboard-Video-Mouse switch, the special purpose computer having embedded security certificates for securely accessing the specific secure remote computer resources, and the special purpose computer having an embedded bios with driver support for input-output devices restricted to keyboard, mouse, video, network, and optionally audio; and
   an internal network switch having a first connection to the internal special purpose computer processor, a second connection to the inbound network connector, and a third connection to an outbound network connector, wherein the internal network switch connects both the internal special purpose computer processor and any computer connected to the inbound network connector to a same network through the outbound network connector.

2. The computer switching device of claim 1, wherein the internal special purpose computer connects with keyboard, video, and mouse connections to the Keyboard-Video-Mouse switch.

3. The computer switching device of claim 2, wherein the one or more outbound connectors comprise: an outbound video connector; an outbound mouse connector; and an outbound keyboard connector; and the one or more inbound connectors comprise: an inbound video connector; an inbound mouse connector; and an inbound keyboard connector.

4. The computer switching device of claim 1, further comprising an outbound audio connector connected to the Keyboard-Video-Mouse switch for connection to physical devices, an inbound audio connector connected to the Keyboard-Video-Mouse switch as part of the first computer connection, and wherein the second computer connection from the special purpose computer to the Keyboard-Video-Mouse switch includes an audio connection.

5. The computer switching device of claim 1, further comprising an internal tamper switch connected to the housing box and to the special purpose computer, and the housing box is sealed such that any physical opening or tampering with the housing box will trigger the tamper switch and void the embedded security certificates.

6. The computer switching device of claim 1, wherein the special purpose computer includes physical connections restricted to keyboard, mouse, video, audio, and network.

7. The computer switching device of claim 4, further comprising an outbound microphone connector connected to an internal voice-over-ip processor connected to a fourth connection on the network switch.

8. The computer switching device of claim 1, wherein the internal network switch further includes a wireless network connection.

9. The computer switching device of claim 1, further comprising at least one button on the housing box and connected to the Keyboard-Video-Mouse switch such that activation of the button causes switching of the Keyboard-Video-Mouse switch of a specific connected computer to the outbound connectors.

10. The computer switching device of claim 1, wherein the Keyboard-Video-Mouse switch observes commands received through the outbound keyboard connection and upon receipt of a specific keystroke sequence causes switching of the Keyboard-Video-Mouse switch of a specific connected computer to the outbound connectors.

11. The computer switching device of claim 1, wherein the housing box is a mobile computer case.

12. The computer switching device of claim 1, further comprising industrial control signal connectors in the housing box, the industrial control signals connected to the special purpose computer to be transmitted to the secure remote computer resource.

13. The computer switching device of claim 1, wherein the internal network switch is a video broadcast network switch and wherein the Keyboard-Video-Mouse switch is further configured to switch between video from the special purpose computer and video received on the video broadcast network.

14. A mobile computing switched device, comprising:
a mobile computer case;
an mobile computer within the mobile computer case;
an internal Keyboard-Video-Mouse switch connected to the mobile computer case for connection to physical input-output devices, and the Keyboard-Video-Mouse switch connected to the mobile computer as a first computer connection to the Keyboard-Video-Mouse switch;
an internal special purpose computer processor configured to remotely operate a secure remote computer resource, the internal special purpose computer connected as a second computer to the Keyboard-Video-Mouse switch, the special purpose computer having embedded security certificates for securely accessing the secure remote computer resources, and the special purpose computer having an embedded bios with driver support for input-output devices restricted to keyboard, mouse, video, network, and optionally audio; and
an internal network switch having a first connection to the internal special purpose computer processor, a second connection to the mobile computer, and a third connection for to an outbound network.

15. The mobile computing device of claim 14, wherein the third connection to an outbound network is a cellular modem.

* * * * *